United States Patent [19]
Holt

[11] Patent Number: 5,263,112
[45] Date of Patent: Nov. 16, 1993

[54] INFRARED FIBER OPTIC DISTRIBUTION SENSOR

[75] Inventor: James C. Holt, Fayetteville, Tenn.

[73] Assignee: The United States of America as represented by the Secretary of the Army, Washington, D.C.

[21] Appl. No.: 970,193

[22] Filed: Nov. 2, 1992

[51] Int. Cl.$^5$ .................................................. G02B 6/16
[52] U.S. Cl. .................................... 385/147; 385/123; 385/137; 356/73.1; 250/227.11
[58] Field of Search ........................ 385/147, 123, 137; 356/73.1; 250/227.11, 227.15; 65/3.11; 87/57

[56] References Cited

U.S. PATENT DOCUMENTS

| | | | |
|---|---|---|---|
| 4,227,907 | 10/1980 | Merritt | 65/3.11 |
| 4,700,607 | 10/1987 | Heine | 87/57 |
| 4,903,574 | 2/1990 | Brown et al. | 87/57 |
| 5,168,539 | 12/1992 | Negishi et al. | 385/147 X |

*Primary Examiner*—John D. Lee
*Assistant Examiner*—Phan T. Heartney
*Attorney, Agent, or Firm*—Hugh P. Nicholson; Freddie M. Bush

[57] ABSTRACT

An Infrared Fiber Optic Distribution Sensor (IFODS) and control system is used in a non-contact method for ensuring that a fiber optic cable is unwound from a supply spool at a nominal angle to thereby reduce the twist and stress imparted to the cable. The system is mounted to a fiber optic winding machine platform for an automatic fiber winding system (AFWS). The AFWS is used to precision wind fiber optic dispensers for the Non-Line of Sight (NLOS) weapon system as well as the Naval Weapons Center's SKYRAY program. The IFODS uses pairs of infrared sources and receivers mounted directly across from each other and perpendicular to the plane of the fiber to sense the position of the fiber. Three pairs of sources/receivers are utilized. They are arranged so that the axis of each pair is offset from the center pair by 0.06 inches. If the fiber optic cable breaks the beam of the top pair the distribution motor will drive the supply spool down until he fiber breaks the beam of the middle pair. If the fiber optic cable breaks the beam of the bottom pair the distribution motor will drive the supply spool up until the fiber breaks the beam of the middle pair. With the fiber coming off the supply spool at a zero angle all twist can be eliminated from the fiber being wound onto the mandrel. The system comprises IFODS, IFODS electronics circuitries, and driver electronic circuitry in combination.

2 Claims, 2 Drawing Sheets

INFRARED FIBER OPTIC DISTRIBUTION SENSOR

DEDICATORY CLAUSE

The invention described herein may be manufactured, used, and licensed by or for the Government for governmental purposes without the payment to me of any royalties thereon.

BACKGROUND OF THE INVENTION

A guidance system for a Non-Line of Sight (NLOS) weapon system is a missile system which employs a glass fiber optic cable to transmit the signal from the launch site to the missile in flight. A missile system which employs such a signal transmission system is the Fog-M (i.e., fiber optic guided missile). The fiber optic or glass fiber is connected at one end to the missile guidance system and to the signal source at the other end. The fiber optic cable is wound on a bobbin from which the fiber optic payout takes place during missile flight. The signal is transmitted through the wound fiber optic material on the bobbin to link the missile during flight with the signal source.

The glass fiber is produced from a high purity silica preform rod wherein the preform rod is heated to its yield point at about 2000° C., and a fiber is drawn from the heated preform. The manufacturing process must be controlled to produce fibers of uniform diameter and mechanical strength. For example, a mechanical strength of optical fibers in excess of $2 \times 10^5$ psi is a desirable feature for certain specialized application (e.g., optical waveguides employing lengths of fiber).

Both mechanical strength of the fiber when manufactured and the ability of the fiber to retain its strength when stored are equally important. During storage the loss of mechanical property values can take place in addition to the loss during fiber drawing. Lack of mechanical strength is due to submicron flaws in the surface attributed, mainly, to chemical attack by atmospheric contaminants (e.g., moisture) during and after fiber drawing. Attempts to solve these problems have been studied by applying organic coating to the fiber following the drawing of the fiber. Failure resulted because those organic coatings are not impervious to moisture or hydroxy penetration. The penetration by moisture or hydroxy resulted in reduced strength of the coated fiber during periods of storage and/or use.

U.S. Pat. No. 4,227,907 issued to James A. Merritt and assigned to the United States of America as represented by the Secretary of the Army, Washington, D.C. disclosed a laser photochemical synthesis coating on optical fiber. As described hereinabove, the fiber which is drawn from a heated preform is immediately hermetically sealed with a layer of silicon nitride of about 0.02 to about 0.20 micrometer thickness. The $Si_3N_4$ is deposited by laser photochemical reactions which forms the $Si_3N_4$ on the freshly drawn silicon optical fibers in an atmospheric controlled chamber in a continuous operation which employs the reactant gases, $SiH_4$ and $NX_3$, wherein x is selected from hydrogen and/or fluorine.

The drawn fiber optic material when received from the manufacturer is coated with a buffer coat which can be an organic compound (e.g., methyl methacrylate, epoxy acrylates (Desota 95 008), polyimides, polyquinolines, and polsilazanes), or an inorganic compound such as $Si_3N_4$. The drawn fiber optic material has a diameter from about 80 to 125 microns or from about 80 to 125 micrometers. The buffer coat when of organic origin adds to this diameter to a total diameter of fiber optic material plus buffer coat to equal about 250 microns. The inorganic coated fiber optical material when coated by the laser photochemical synthesis method increases the diameter by a smaller amount since the coating of $Si_3N_4$ ranges from about 0.02 micrometers to about 0.20 micrometers.

An additional requirement for glass fiber coated with a buffer coat prior to being wound on a bobbin is to ensure that the fiber optic materials payout evenly from the bobbin to avoid breakage or malfunction of the fiber optic connection between the missile and the signal source sending the signal.

When winding of optical fiber onto a bobbin from the optical fiber supply spool, the peel angle has now been determined to be critical, although this criticality was not earlier recognized. It was determined during a strength degradation study of the fiber optic cable wound by an engineering developing model (EDM) winder system that the winder imparted unacceptable stress to the fiber optic cable. In efforts to reduce or eliminate the known problems of the EDM system, one of the major and most serious problems was recognized. This most serious problem resulted from the fiber optic cable not entering the winding path at an acceptable angle, and as a result thereof, some twist was transferred to the fiber optic cable. The term fiber optic cable is also used in the art as another description of the fiber wound on a bobbin. Although, very small in diameter as contrasted with the term "cable" as applied to other fields and uses, this description avoids the double use of "fiber" in fiber optic fiber. Therefore, the term fiber optic cable is used interchangeably with fiber optic fiber.

Another problem surfaced during the strength degradation study which relates to the use of mechanical "fingers" that are in constant contact with the fiber to help avoid a "jump" of the fiber optic cable when its peel point from supply spool is at the extreme edge of the path from its present location to its next peel point. This results in an impulse that the tension control system of the winder cannot compensate for. The conclusive opinion based on handling studies indicate that constant contact of mechanical fingers with the fiber greatly increases the chance of fiber failure. The relationship of increased peel angle also results in a certain amount of twist being applied (as earlier noted) to the fiber optic cable. This twist can accumulate in the winding path thereby making the fiber optic cable have a tendency to roll when it is wound onto a bobbin.

The advantages of a non-contact device that regulates the peel angle and which thereby reduces the twist and stress imparted to the fiber optic cable are recognized.

Therefore, an object of this invention is to provide a non-contact device and method for assuring that the fiber optic cable is unwound from a supply spool at a nominal angle to the bobbin on which the fiber optic cable is wound.

Another object of this invention is to provide a device which functions by employing multiple pairs of source and receivers as the control means for proper positioning of a fiber optic cable supply spool to a winder platform to thereby provide a predetermined peel angle of the cable while being unwound from the supply spool and while being wound on a bobbin.

SUMMARY OF THE INVENTION

The device of this invention is best identified as an "Infrared Fiber Optic Distribution Sensor", (IFODS). The IFODS is a non-contact means for assuring that fiber optic cable is unwound from a supply spool at a nominal angle to a fiber optic cable winding machine which winds the fiber optic cable on a bobbin. The IFODS uses pairs of infrared sources and receivers mounted directly across from each other and perpendicular to the plane of the fiber to sense the position of the fiber. A preferred combination employs three pairs of sources/receivers which are arranged so that the axis of each pair is offset in a vertical arrangement from the center pair by distance of about 0.06 inch. The positioning of the fiber supply source is achieved by a distribution motor which is electronically connected to three identical IFODS electronics circuitries mounted on a fiber optics sensor support structure (FOS3). The FOS3 is mounted to the winding platform immediately after the supply spool mounting fixture which comprises a distribution motor for proper positioning of a fiber supply spool including a supply spool motor for turning the fiber supply spool during a winding operation. In operation, if the fiber optic cable breaks the beam of the top pair of sensors the distribution motor will drive the supply spool down until the fiber breaks the beam of the middle pair of sensors. If the fiber optic cable breaks the beam of the bottom pair, the distribution motor will drive the supply spool up until the fiber breaks the beam of the middle pair of sensors. This sequence of control events provides the control means to achieve a zero angle of the fiber optic cable coming off the supply spool relative to the winder. The described controls for zero angle supply eliminates all twist from the fiber being wound onto the mandrel or bobbin. The control system also eliminates the need for a mechanical sensor that can cause serious damage to the buffer coating of the fiber optic cable.

DESCRIPTION OF THE PREFERRED EMBODIMENT(S)

The Infrared Fiber Optic Distribution Sensor (IFODS) is a unique device employing a non-contact method for assuring that a fiber optic cable is unwound from a supply spool at a nominal angle. The system is mounted on a fiber optic winding platform used to support an automatic fiber winding system. The system is used to precision wind fiber optic cable dispensers for a Non-Line Of Sight (NLOS) weapon system. The IFODS uses pairs of infrared sources and receivers mounted directly across from each other and perpendicular to the plane of the fiber to sense the position of the fiber relative to the winding machine or winder. Three pairs of sources/receivers are utilized. They are arranged so that the axis of each pair is offset from the center pair by 0.06 inches. If the fiber optic cable breaks the beam of the top pair, the distribution motor will drive the supply spool down until the fiber breaks the beam of the middle pair. If the fiber optic cable breaks the beam of the bottom pair, the distribution motor will drive the supply spool up until the fiber breaks the beam of the middle pair. With the fiber coming off the supply spool at a zero angle, all twist can be eliminated from the fiber being wound onto the mandrel. The system also eliminates the need for a mechanical sensor that can cause serious damage to the buffer coating of the fiber optic cable.

Figure 1:
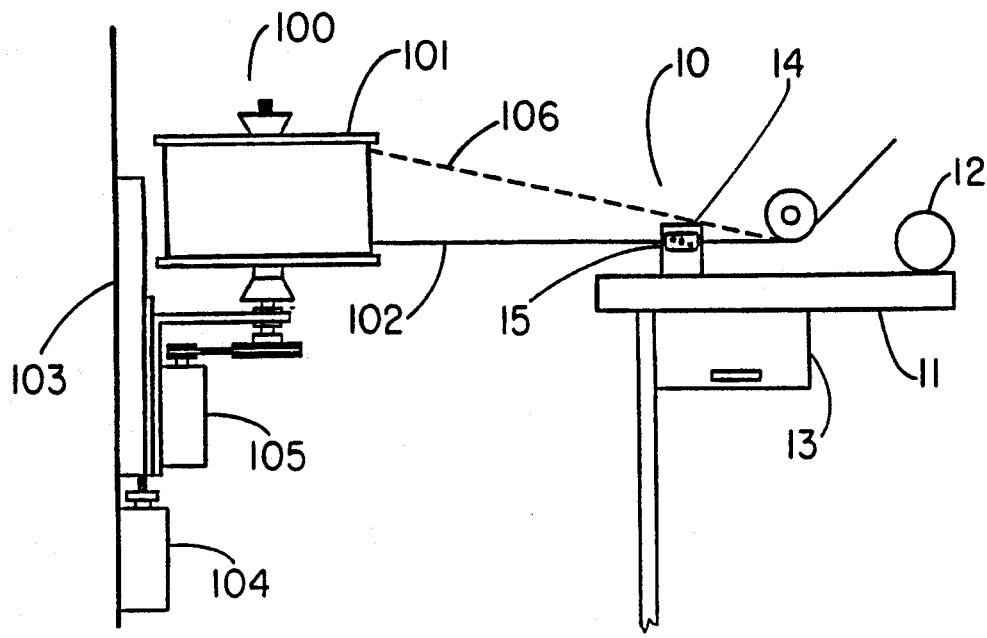
FIG. 1 depicts a first, second, and third infrared fiber optic distribution sensor mounted on a fiber optic cable winder platform and positioned directly across from a fiber optic cable supply system.

In further reference to the Figures of the Drawing, FIG. 1, the infrared fiber optic distribution sensor (IFODS) 10 is shown mounted on a winder platform 11 which also supports a winding machine with mandrel or bobbin 12. IFODS electronics (block diagram 13 of FIG. 1) is shown in detail in FIGS. 3, as IFODS electronic circuitry 20. Three pairs of sources/receivers 14/15, 16/17, and 18/19, which are electronically connected to identical first, second, and third IFODS electronic circuitries 20, 30, and 40, are shown in relationship to a fiber optic cable supply system 100. This supply system comprises a fiber optic cable supply spool 101 with fiber optic cable 102 which is supplied off the spool at a zero angle through pairs of sources/receivers 14/15, 16/17, and 18/19 to a fiber optic cable winding machine 12 with mandrel or bobbin for an unacceptable "peel angle" is illustrated by dashed line 106. The source in all pairs is an infrared LED. Located between each pair 14/15, 16/17, and 18/19 of source/receivers is a fiber optic cable path 1, 2, and 3, respectively of FIGS. 2 and 3. The fiber optic supply system comprises a mounting fixture 103 for supporting in a vertical alignment a distribution motor 104 which is controlled by a command from a driver electronics circuitry 50 shown in FIG. 3. The fiber optic cable supply spool 101 is driven by supply spool motor 105 at optimum winding speed compatible with a fiber optic winding machine. As noted three pairs of sources/receivers are utilized and mounted directly across from each other and perpendicular to the plane of the fiber optic cable to sense the position of the fiber relative to the winding machine or winder. The sources/receivers are arranged so that the axis of each pair is offset from the center pair by about 0.06 inches. In operation, if the fiber optic cable breaks the beam (source 14 which is an infrared LED) and detection channel of top pairs (14/15) the distribution motor (in response to driver electronics of FIG. 3) will drive the supply spool down until the fiber breaks the beam (source 16) and detection channel of the middle pair (16/17). If the fiber optic cable passing through detection channel breaks the beam (source 18) of the bottom pair (18/19), the distribution motor (in response to electronics 50 of FIG. 3) will drive the supply spool up until the fiber breaks the beam of LED source 16 of the middle pair. The distribution motor as controlled by driver electronics will then cease operation. With the fiber coming off the supply spool at zero angle all twist can be eliminated from the fiber being wound onto the mandrel or bobbin.

Figure 2:
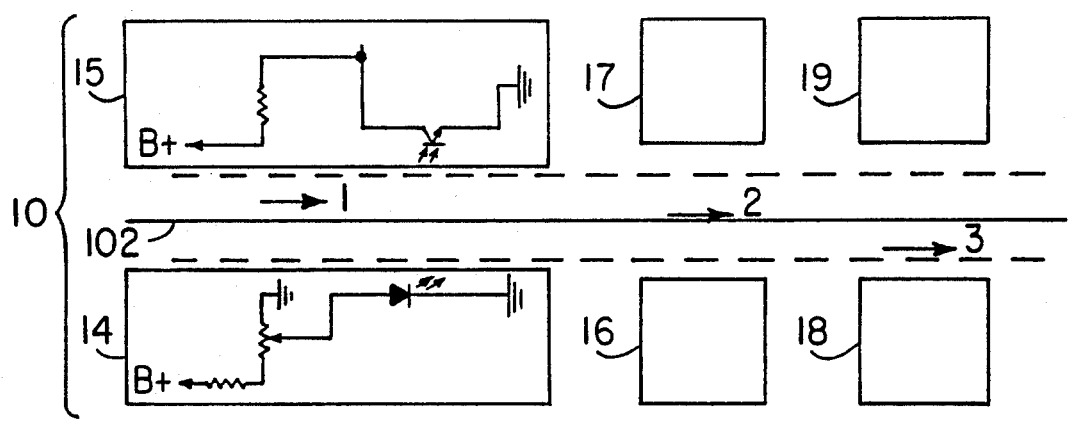
FIG. 2 depicts an enlarged view of a first, second, and third infrared source and receiver of fiber optic distribution sensor.

FIG. 2 depicts sources and receivers pairs 14/15, 16/17, and 18/19 of FIG. 1 and enlarged to show relationship to a fiber optic cable 102 traversing space between sources and receivers with axis of each offset by about 0.06 inches in a vertical arrangement of top, middle, and bottom.

Figure 3:
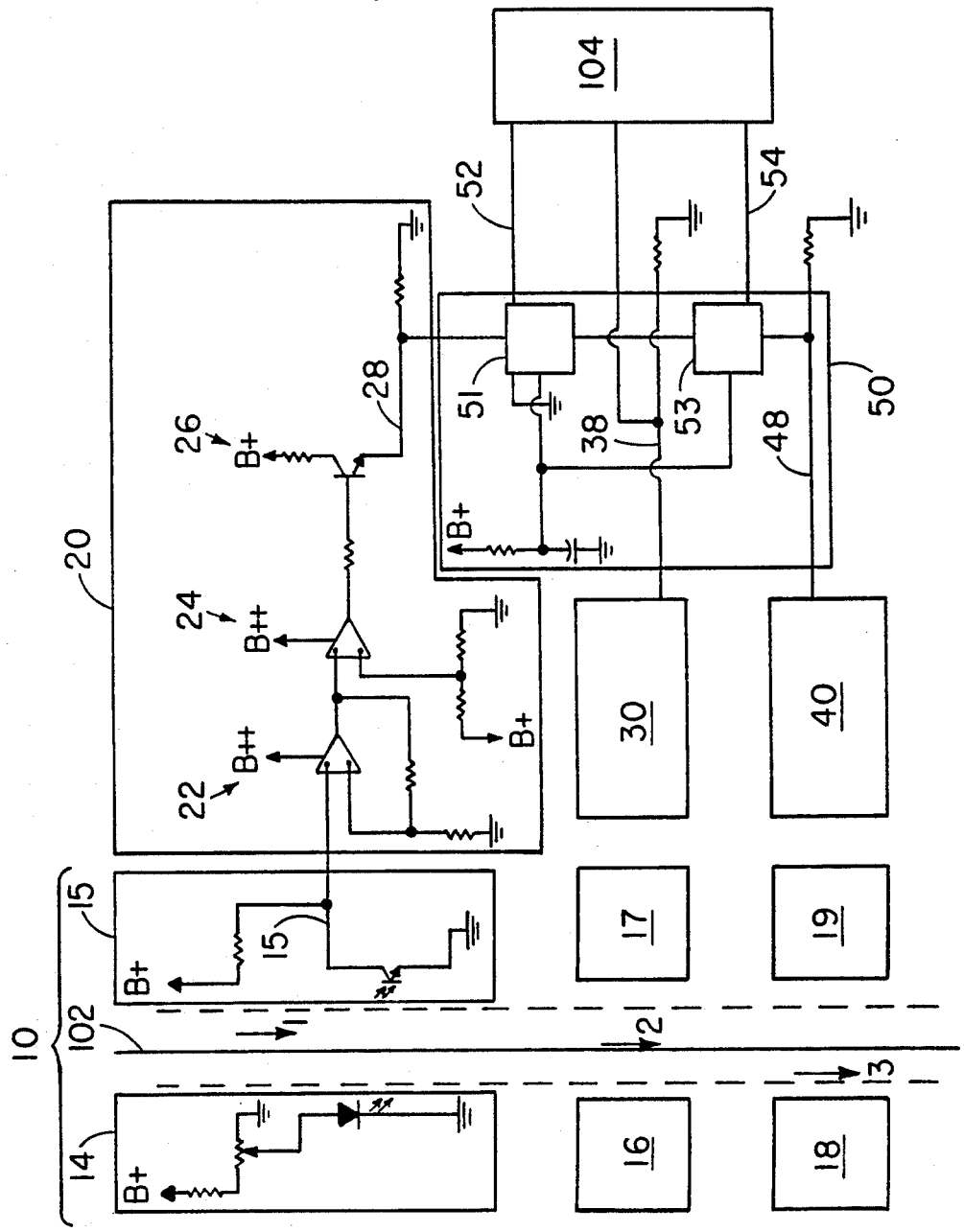
FIG. 3 depicts a schematic view of a first infrared fiber optics distribution electronic circuitry 20 for processing a pulse received from a first infrared fiber optic distribution sensor source and to initiate an appropriate command to a driver electronics circuitry; a block diagram of a second infrared fiber optics distribution electronic circuitry 30 for processing a pulse received from a second infrared fiber optic distribution sensor source and to initiate an appropriate command to a driver electronics circuitry; a block diagram view of a third infrared fiber optics distribution electronics circuitry 40 for processing a pulse received from a third fiber optic distribution sensor source and to initiate an appropriate command to a driver electronics circuitry; and, a driver electronics circuitry 50 for receiving a command from a first, second, and third infrared fiber optics distribution electronics circuitries and transmitting a command to a distribution motor.

FIG. 3 depicts infrared fiber optic distribution sensor which comprises a LED source 14 of a beam of infrared light emitting from LED. When this beam is received by receiver 15, a photo Darlington transistor, a voltage input into the first amplifier stage 22 which amplifies the charge in voltage by a factor of two. A second amplifier stage 24 is designed and functions as a comparator. The voltage designation of B+ and B++ is to indicate the relative voltage of a positive value where B++ is a larger voltage value, for example 5 volts and 12 volts, respectively, for B+ and B++ are typical values respectively. Other values for supply voltages and bias voltages may be used with the operational amplifier circuits. Such voltages are routine and are not shown in relationship to other elements of circuitries. Thus, as an example, any input voltage that is higher than a reference voltage of 3.95 volts causes the comparator's output to go to the reference voltage thereby forward biasing the output transistor 26 to go to a logic "high". This command 28 is then sent to driver electronics circuitry 50 and results in a command 52 to the distribution motor 104 of FIGS. 1 and 5 to lower the supply spool. FIG. 3 also depicts a block diagram infrared fiber optic distribution sensor which comprises a LED source 18 of a beam 19 of infrared light emitting from LED. When this beam is received by receiver 19, a photo Darlington transistor, a voltage input into the first amplifier stage which amplifies the change in voltage by a factor of two. A second amplifier stage is designed and functions as a comparator. Thus, any input voltage that is higher than a reference voltage of 3.95 volts causes the comparator's output to go to the reference voltage thereby forward biasing the output transistor to go to a logic "low" command. This command 48 is then sent to driver electronics circuitry 50 and results in a command 54 to the distribution motor 104 of FIGS. 1 and 5 to raise the supply spool up until the fiber breaks the beam 16 of the middle pair of source/receiver. The distribution motor will then cease operation. Thus, FIG. 3 also depicts an infrared fiber optic distribution sensor which comprises a LED source 16 of a beam of infrared light emitting from LED. When this beam is received by receiver 17, a photo Darlington transistor, a voltage input into the first amplifier stage which amplifies the charge in voltage by a factor of two. A second amplifier stage is designed and functions as a comparator. Thus, any input voltage that is higher than a reference voltage of 3.95 volts causes the comparator's output to go to the reference voltage thereby forward biasing the output transistor to go to a logic "zero angle" command (correct spool position). This command 38 is then sent to driver electronics circuitry 50 and results in a command to the distribution motor 104 of FIG. 1 to cease operation and the driver electronics 50 depicted in FIG. 3 are reset by triggering of the middle pair of sensors.

FIG. 3 depicts inputs 28, 38, and 48 which are outputs from circuits 20, 30, and 40 resulting from receivers 15, 17, and 19, positioned in a vertical alignment denoted as top, middle, and bottom, respectively. The functions of inputs 28 and 48 are to lower and raise the distribution motor 104, respectively. The function of input 38 from circuit 30 is to reset driver electronics for circuits 20 and 40 as a result of triggering of action of the middle pair of sensors. Thus, when the fiber breaks the beam of LED source 14 of FIG. 3 or the beam of LED source 18 of FIG. 3, the distribution motor will drive the supply spool up or down, respectively, until the fiber breaks the beam of LED source 16 of FIG. 3 when the driver electronics 50 are reset by a "zero angle" of the fiber spooling from the supply spool.

Figure 4:
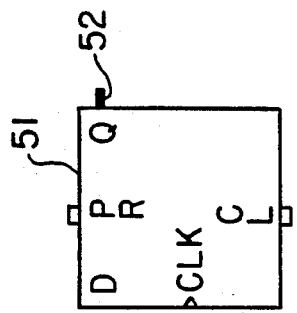
FIG. 4 depicts an enlarged view of chip 51 of FIG. 3 with designated internal working parts.

The driver electronic parts 51 and 53 of FIG. 3 are identical chips which are commercially available from Texas Instrument Company as part number 74LS74 and which functions in "flip-flop" operations. One chip 51 is shown in an enlarged view in FIG. 4. This chip has designated abbreviations for specific description of internal working parts as follows: wherein CL is clear; CLK is clock; D is data; PR is preset; and Q is output. In operation, the output from chip 51 after receiving an output 28 from the first IFODS electronic circuitry 20 of FIG. 32 outputs a Q output which results in command 52 to distribution motor 104 of FIGS. 1 and 3 to lower the supply spool. In a similar manner, the output from chip 53 after receiving an output 48 from the third IFODS electronic circuitry 40 of FIG. 3 outputs a Q output which results in command 54 to distribution motor 104 of FIGS. 1 and 3 to raise the supply spool.

A second IFODS electronic circuitry 30 of FIG. 3 receives input from receiver 17 and processes in similar manner to circuits 20 and 40 to send output; however, the output goes to a middle connector of driver electronics circuit 50 which achieves a triggering action to cause distribution motor 104 to cease operation, and the driver electronics chip 51 or 53 are reset, depending on whether distribution motor 104 was last operating in a lowering mode or a raising mode as a result of commands 52 and 54, respectively.

I claim:

1. A device for providing a predetermined peel angle of a fiber optic cable while said fiber optic cable is being unwound from a fiber optic cable supply spool and while said fiber optic cable is being rewound on a mandrel or bobbin, said device comprising:

A providing a supply system for a fiber optic cable, said supply system comprising:
   (i) a mounting fixture for supporting said supply system in a vertical alignment;
   (ii) a distribution motor mounted to said mounting fixture, and positioned below a supply spool motor for raising and lowering said supply spool motor and a fiber optic cable spool supported and driven by said supply spool motor;
   (iii) a supply spool motor which is raised or lowered by said distribution motor in response to a command from a driver electronics circuit of said device; and,
   (iv) a fiber supply spool containing wound fiber optic cable which is to be unwound while retaining predetermined peel angle during a rewinding operation, said predetermined peel angle controlled by relative position of supply spool motor and said fiber supply spool containing wound fiber optic cable to a winding machine provided with a mandrel or bobbin for receiving said fiber optic cable, said fiber supply spool connected to said supply spool motor for rotating at a predetermined speed compatible with a winding machine provided with a mandrel or bobbin for receiving said fiber optic cable during a winding operation;

B. providing a winder platform for supporting a variable speed winding machine, an infrared fiber optic distribution sensor (IFODS), and IFODS electronics circuitries of said device;
 (i) said IFODS in three pairs mounted on said winder platform directly across from each other and perpendicular to the plane of said fiber optic cable to sense the position of a fiber optic cable as said fiber optic cable passes through a detection channel which is a space between each of said IFODS pairs, said each of said IFODS pair comprised of an infrared source and receiver for said infrared source, said IFODS pairs of sources and receivers arranged in a top middle and bottom relationship so that the axis of each pair is offset from the middle pair by a predetermined distance whereby during a winding operation as the fiber optic cable passing through said detection channel to a winding machine if the fiber optic cable breaks the infrared source of a top pair of source/receiver the distribution motor in response to an electronic command from a driver electronics will drive said fiber supply spool down until the fiber optic cable breaks the beam of the middle pair of source/receiver which resets a driver electronics circuit and if the fiber optic cable breaks the beam of the bottom pair the distribution motor in response to an electronic command from a driver electronics will drive said fiber supply spool up until the fiber optic cable breaks the beam of the middle pair of source/receiver which resets a driver electronics circuit;
 (ii) said IFODS electronics circuitries mounted on said winder platform, said IFODS electronics circuitries functioning when a beam from an infrared source is broken to provide an input to a driver electronics circuitry which processes a command to said distribution motor to position said supply spool motor and fiber supply spool to achieve a predetermined peel angle as required for rewinding said fiber optic cable on a mandrel or bobbin, said IFODS electronic circuitries defined hereinbelow under C; and,
 (iii) said driver electronics mounted on said winder platform for receiving input from said IFODS electronic circuitry, said driver electronics processing said input and outputting a command to said distribution motor, said driver electronics defined hereinbelow under D;

C. said IFODS electronic circuitries comprising three identical IFODS electronic circuits with each of said circuits being electrically adapted for receiving the outputs from a first, second, and third infrared source and receiver pairs, respectively, said first, second, and third infrared source and receiver pairs arranged in said top, middle, and bottom relationship, said first IFODS electronic circuits comprising:
 (i) a voltage input electrically connected to said top infrared receiver;
 (ii) a first amplifier stage connected to said voltage input and said top infrared receiver for amplifying a change in voltage by a factor of two;
 (iii) a second amplifier stage connected for receiving an amplified change in voltage from said first amplifier stage, said second amplifier stage designed to function as a comparator for comparing input voltage and when said input voltage exceeds a predetermined reference voltage said comparator output goes to said predetermined reference voltage thereby forward biasing an output transistor means to go to a logic high which is a first command output sent to a top input receiver of a driver electronic circuitry, said driver electronic circuitry processing said first command input to output a first command to said distribution motor to lower said supply spool to retain said fiber optic cable at said predetermined peel angle;
 (iv) a second IFODS electronic circuitry as defined under C(i)-(iii) above, said second IFODS electronic circuitry adapted for forward biasing an output transistor means to go to a logic low which is a first command output sent to a bottom receiver of a driver electronic circuitry, said driver electronic circuitry processing said first command input to output a first command to said distribution motor to raise said supply spool to retain said fiber optic cable at said predetermined peel angle;
 (v) a third IFODS electronic circuitry as defined under C(i)-(iii) above, said third IFODS electronic circuitry adapted for forward biasing an output transistor means to go to the logic "zero angle" (correct spool position) which is a first command output sent to a middle receiver of a driver electronic circuitry, said driver electronics circuitry and results in a command for said distribution motor to cease operation and the driver electronics are subsequently reset for either top or bottom input receiver of a driver electronic circuitry depending on whether said command for said distribution motor to cease operation resulted from either a command to raise or lower said distribution motor; and, D. said driver electronics circuitries comprising:
 (i) a voltage source for connecting to a first and second identical chips, each of said chips having a clock function, a first and second input data function, a first and second output data function, a preset function, and a clear function;
 (ii) said first chip connected to said voltage source, a first input data function of said first chip connected to said output of said first IFODS electronic circuitry, a second input data function of said first chip connected to said third IFODS electronic circuitry;
 (iii) said first output data function of said first chip connected to said command function to said distribution motor to achieve the lowering of said supply spool; and,
 (iv) said second output function of said first chip connected to said second input data function of said first chip which is connected to said third IFODS electronic circuitry and to said clear function of said first chip to achieve cease operation of lowering said distribution motor;

(v) said second chip connected to said voltage source, a first input data function of said second chip connected to said output of said second IFODS electronic circuitry, a second input data of said second chip connected to said third IFODS electronic circuitry;

(vi) said second output data function of said second chip connected to said command function to said distribution motor to achieve the raising of said supply spool; and, (vii) said second output function of said second chip connected to said second input data function of said second chip which is connected to said third IFODS electronic circuitry and to said clear function of said second chip to achieve cease operation of raising said distribution motor.

2. A fiber optic distribution sensor and an electronic control system for a rewinding system for ensuring that a fiber optic cable is unwound from a fiber optic cable supply spool at a nominal angle in a rewinding process for transferring said fiber optic cable to a mandrel or a bobbin, said fiber optic distribution sensors and electronic controls for a rewinding system comprising in combination infrared fiber optic distribution sensors (IFODS), IFODS electronics circuitries, and a driver electronic circuitry, said fiber optic distribution sensor and electronic control system comprising:

A. said IFODS in three pairs mounted on a winder platform and positioned directly across from each other and perpendicular to the plane of a fiber optic cable to sense the position of said fiber optic cable as it passes through a detection channel which is a space between each of said IFODS pairs, said each of said IFODS pairs comprised of an infrared source and receiver for said infrared source, said IFODS pairs of sources and receivers arranged in a top middle and bottom relationship so that the axis of each pair is offset from the middle pair by a predetermined distance whereby during a winding operation as said fiber optic cable passes through said detection channel to a winding machine the fiber optic cable breaks the infrared source of a top pair of source/receiver a distribution motor in response to an electronic command from a driver electronics will drive a fiber supply spool down until said fiber optic cable breaks an infrared source of a middle pair of source/receiver which resets a driver electronics circuit and when said fiber optic cable breaks an infrared source of a bottom pair of source/receiver the distribution motor in response to an electronic command from a driver electronics will drive said fiber supply spool up until the fiber optic cable breaks the beam of the middle pair of source/receiver which resets a driver electronics circuit;

(ii) said receiver of each of said source/receiver pair connected to a power source and electrically connected to said top, middle, and bottom input receiver of identical IFODS electronics circuitries mounted on said winder platform, said IFODS electronics circuitries functioning when a beam from an infrared source is broken to provide an input to a driver electronics circuitry which processes a command to said distribution motor to position said supply spool motor and fiber supply spool to achieve a predetermined peel angle as required for rewinding said fiber optic cable on a mandrel or bobbin, said IFODS electronic circuitries defined under B(i-v); and said driver electronics mounted on said winder platform for receiving input from said IFODS electronic circuitry, said driver electronics processing said input and outputting a command to said distribution motor, said driver electronics defined below under C(i-vi);

B. said IFODS electronic circuitries comprising three identical first, second, and third IFODS electronic circuits with each of said circuits being electrically adapted for receiving the outputs from a first, second, and third infrared source and receiver pairs, respectively, said first IFODS electronic circuits comprising:

(i) a voltage input electrically connected to said top infrared receiver;

(ii) a first amplifier stage connected to said voltage input and said top infrared receiver for amplifying a change in voltage by a factor of two;

(iii) a second amplifier stage connected for receiving an amplified change in voltage from said first amplifier stage, said second amplifier stage designed to function as a comparator for comparing input voltage and when said input voltage exceeds a predetermined reference voltage said comparator output goes to said predetermined reference voltage thereby forward biasing an output transistor means to go to a logic high which is a first command output sent to a top input receiver of a driver electronic circuitry, said driver electronic circuitry processing said first command input to output a first command to said distribution motor to lower said supply spool to retain said fiber optic cable at said predetermined peel angle;

(iv) a second IFODS electronic circuitry as defined under B(i)-(iii) above, said second IFODS electronic circuitry adapted for forward biasing an output transistor means to go to a logic low which is a first command output sent to a bottom receiver of a driver electronic circuitry, said driver electronic circuitry processing said first command input to output a first command to said distribution motor to raise said supply spool to retain said fiber optic cable at said predetermined peel angle;

(v) a third IFODS electronic circuitry as defined under B(i)-(iii) above, said third IFODS electronic circuitry adapted for forward biasing an output transistor means to go to the logic "zero angle" (correct spool position) which is a first command output sent to a middle receiver of a driver electronic circuitry, said driver electronics circuitry and results in a command for said distribution motor to cease operation and the driver electronics are subsequently reset for either top or bottom input receiver of a driver electronic circuitry depending on whether said command for said distribution motor to cease operation resulted from either a command to raise or lower said distribution motor; and, C. said driver electronics circuitries comprising:

(i) a voltage source connected to a first and second identical chips, each of said chips having a clock function, a first and second input data function, a first and second output data function, a preset function, and a clear function;

(ii) said first chip connected to said voltage source, a first input data function of said first chip connected to said output of said first IFODS electronic circuitry, a second input data function of said first chip connected to said third IFODS electronic circuitry;

(iii) said first output data function of said first chip connected to said command function to said distribution motor to achieve the lowering of said supply spool; and, (iv) said second output function of said first chip connected to said second input data function of said first chip which is connected to said third IFODS electronic circuitry and to said clear function of said first chip to achieve cease operation of lowering said distribution motor;

(v) said second chip connected to said voltage source, a first input data function of said second chip connected to said output of said second IFODS electronic circuitry, a second input data of said second chip connected to said third IFODS electronic circuitry;

(vi) said second output data function of said second chip connected to said command function to said distribution motor to achieve the raising of said supply spool; and, (vii) said second output function of said second chip connected to said second input data function of said second chip which is connected to said third IFODS electronic circuitry and to said clear function of said second chip to achieve cease operation of raising said distribution motor.

* * * * *